Figure 1:
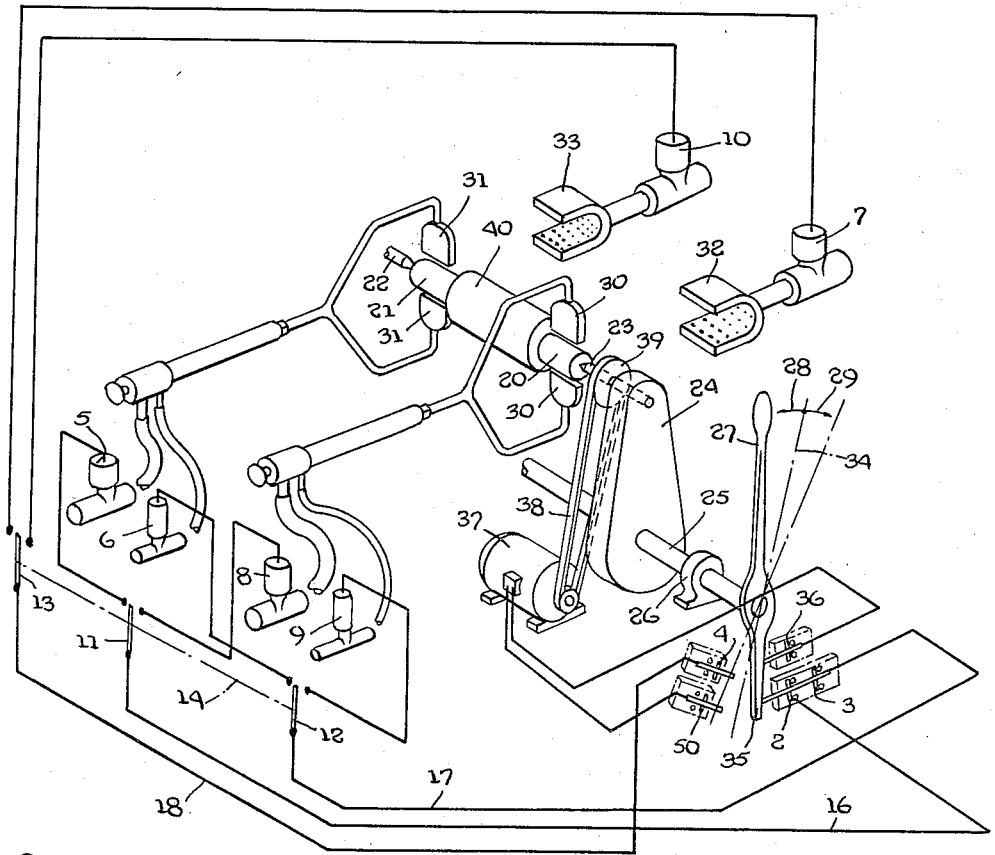

July 6, 1954  H. W. GRÖNEGRESS  2,683,031
SURFACE HARDENING MACHINE
Filed Aug. 9, 1950

INVENTOR.
HANS WILHELM GRÖNEGRESS
BY
ATTORNEY

Patented July 6, 1954

2,683,031

UNITED STATES PATENT OFFICE 2,683,031

SURFACE HARDENING MACHINE

Hans Wilhelm Grönegress, Gevelsberg (Westphalia), Germany, assignor to Paul Ferd. Peddinghaus, Gevelsberg (Westphalia), Germany, a firm of Germany Application August 9, 1950, Serial No. 178,409

2 Claims. (Cl. 266—4)

The invention relates to surface hardening machines.

The mode of operation of these machines differs from the case-hardening of steel by carbonization insofar as the surface of the workpieces to be hardened is quickly and intensively heated by burners whereby a zone of high heat-concentration is produced directly beneath the surface of these articles; these highly heated surface portions are immediately chilled with water or aqueous liquids.

The method is generally performed in surface-hardening machines wherein the workpiece is transported from the heating to the chilling places and vice versa; the operation of the burners and the chilling devices is so controlled that the heating and chilling of the work pieces takes place in succession. The handling of these discontinuously operative machines is greatly simplified by a coupling of the supply valves for the gas and oxygen burners and of the water supply valves with the transport of the work pieces through the machine.

The hitherto used mechanically controlled valves have a great disadvantage; due to the unavoidable wear frequent leakages occur and the stuffing boxes must be continuously tightened. If several places of one work piece are to be hardened, this can only be performed simultaneously with mechanically controlled valves.

Also the work supervision is extremely difficult in the case of the simultaneous hardening of articles at numerous places, such as the hardening of crank shafts and cam shafts and the danger arises that the various bearing places are either not sufficiently heated or are over-heated. Therefore, these bearing places have been subdivided into groups which are simultaneously hardened. In this case, however, the advantage of a coercitive simultaneous control of the machine had to be dispensed with and the operation of the hardening machine was accordingly greatly complicated.

It is the primary object of the invention to eliminate the difficulties arising from the contemporaneous actuation of mechanically controlled gas and oxygen supply valves particularly in those cases where several places of a work piece are to be hardened, for instance, several bearing places of shafts.

It is also an object of the invention to facilitate the surveillance and control of the work.

It is another object of the invention to prevent unequal heating during the performance of the above stated group work.

Suggestions have been made to replace the mechanically controlled rapid valves by electromagnetically operated valve systems for the supply of gas, the oxygen and the water and to effect the switching of these magnetic valves by main switches which are located on the machine frame and are controlled by swinging the work pieces from the burners to the sprayers and vice versa.

If in a surface hardening machine provided with electromagnetic valves a plurality of bearing places or a plurality of groups thereof are hardened electromagnetic valves must be provided for the gas, the oxygen and the water sprayers. Since by the same swinging movement of the work piece the same main switch can only be actuated by subdivision of the work into a plurality of groups the customary switching means for the electromagnetic valves cannot be used.

It is, therefore, a further object of this invention to enable a selective operation of the individual supply valves or group of valves in spite of one common group of final or main switches.

The invention will now be described in detail and with reference to the accompanying drawings illustrating a preferred embodiment thereof.

In the drawings

Figure 2:
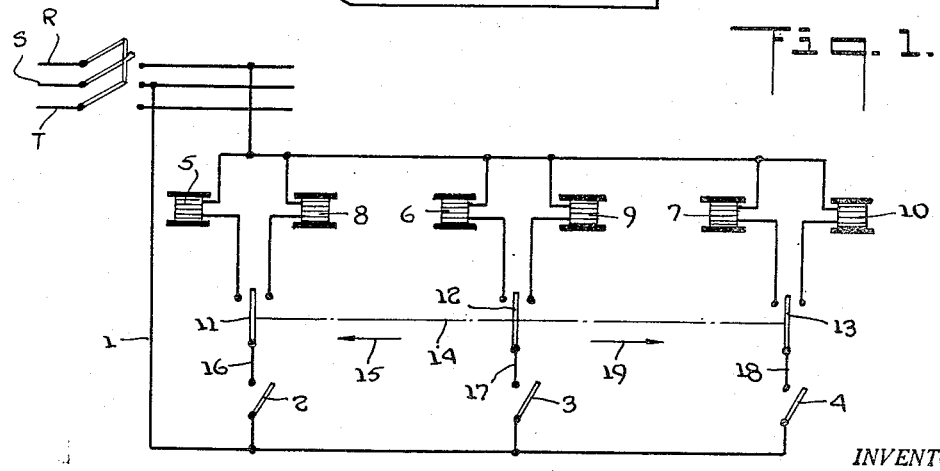

Fig. 1 is a schematic perspective view of a surface hardening machine including its control device, in accordance with the present invention, and Fig. 2 is a wiring diagram for the control of the magnetic valves.

Shaft 40, Fig. 1, the work-piece which is to be intermittently hardened at its bearing places 20, 21 is held between center punches 22, 23 mounted on a pair of supporting members 24 secured on a shaft 25 of which only one member 24 being shown. Shaft 25 is supported in bearings 26 suitably mounted in the machine frame; the shaft may be rotated by a lever 27 in the direction of the arrows 28, 29. By swinging hand operated lever 27 from a center position indicated by line 34, in the direction of arrow 28 shaft 40 may be operatively positioned between the hardening burners 30 and 31 or by swinging the same in the direction of arrow 29 with the water sprayers 32, 33, both being mounted in the machine frame.

The control mechanism of the hardening machine comprises the final or main switches 2, 3, 4, Fig. 2, for the fuel gas, the oxygen and a chilling agent, for instance, water, the magnet valve 5 for the fuel gas, valve 6 for the oxygen and valve 7 for the water to be supplied to a first hardening area 21 or group of hardening areas, corresponding magnet valves 8, 9, 10 for a second hardening area 20 or group of hardening areas and the reversal or change-over switches 11, 12, 13. Tubes 41 conduct the fuel gas and oxygen mixture to the burners 30, 31 and tubes 42 the chilling medium, such as water, to the sprayers 33, 32.

Change-over switches 11, 12, 13 are coupled through shift rod 14 for a unison operation; they serve the purpose of actuating either magnet valves 5, 6, 7 of the first hardening group or magnet valves 8, 9, 10 of the second hardening group and are controlled by the final or main switches 2, 3, 4 which are coordinated to both groups.

This control device is operated, as follows.

During the setting of the work piece to be hardened between the center punches 22, 23 hand lever 27 is in its center position or in the position indicated by line 34, Fig. 1.

In order to harden area 21 of the shaft forming the one shaft journal shift rod 14 is manually displaced in the direction of arrow 15. In this position valves 5, 6, 7 of the first hardening group, which are connected with the main conductor R of the current system, are connected with the branch conductors 16, 17, 18 whereas the magnet valves 8, 9, 10 of the second group are disconnected from these branch conductors 16, 17, 18.

Now lever 27 is swung in the direction of arrow 28 and its arm 35 thereby first closes switch 36 of the drive motor 37. This motor drives through belt 38 the pulley 39 located on center punch 23; the rotation of pulley 39 is transmitted to shaft 40. If the swinging of lever 27 is continued the final switch 2 is closed. The current flows (Fig. 2) from main conductor S through conductor 1, final switch 2, conductor 16, magnet valve 5 to main conductor R. The circuit is, therefore, closed and the magnet valve 5 opens the supply of the fuel gas, which is ignited by a continuously operative flame.

Shortly before the final position of lever 27 is reached the final switch 3 is actuated and the oxygen supply started through magnet valve 6. The journal 21 placed between burners 31 is now heated on all sides. Burners 30 are not operative any longer.

As soon as the required surface temperature of the shaft journal at hardening area 21 is attained, lever 27 is swung in the direction of arrow 29; the shaft 25 and therewith the levers 24 also swing in the direction of arrow 29; and the work piece is thereby swung into the range of the sprayers. At the same time final switches 3 and 2 are disconnected whereby first the oxygen valve magnet and then the fuel gas valve magnet are disconnected from the current supply.

In the middle position 34 of lever 27 also the motor switch is opened and disconnects the motor 37 from the current supply. Upon further swinging of lever 27 final switch 4 connects the current for water valve 7; the water sprayer 31 is started whereby shaft journal 21 is chilled. At about the same time motor 37 is set into operation by switch 50.

Upon actuation of switch rod 14 in the direction of arrow 29 the magnet valves 5, 6, 7 of the first hardening group are disconnected from conductor branches 16, 17, 18 and magnet valves 8, 9, 10 of the second group are connected. Upon actuation of lever 27 final switches 2, 3, 4 will actuate magnet valves 8, 9, 10 in a corresponding manner whereby the hardening is effected at the area 20 of the shaft journal.

It is apparent from the above that by a simple shifting of switch rod 14 in the direction of the arrows 15 and 19 the shaft 40 is heat treated at either area 21 or 20 whereby the operation in both cases is controlled by the same hand lever 27 and the same final or main switches 2, 3, 4.

By the provision of additional contacts to the change-over switches the device may be adapted to the operation of any desired number of hardening areas.

The invention has been described with reference to a preferred embodiment and it will be understood that many variations and modifications thereof may be resorted to without departure from the scope of the invention as defined in the following claims.

I claim:

1. A surface flame hardening apparatus comprising a frame, a shaft rotatably mounted on the frame, a pair of supporting members spaced from each other in a direction along the shaft axis, each of said supporting members having one end non-rotatably secured to said shaft and extending from said one end in a direction away from said shaft axis, a pair of rotatable mounting means each attached to a respective one of the opposite ends of said supporting members for rotatably mounting therebetween the opposite ends of a work-piece to be flame hardened by said apparatus, whereby oscillation of said shaft will cause said mounting means and work-piece mounted therebetween to oscillate in an arc about said shaft axis, a pair of spaced burners each positioned to direct a flame on a local area of said work-piece when said shaft is rotated to a first position, a pair of spray nozzles each positioned to direct a spray of cooling fluid on a respective one of said local areas of the work-piece when said shaft is rotated to a second position, an electric motor, means drivingly connecting said motor to one of said rotatable mounting means whereby actuation of the motor will cause rotation of the mounting means and hence also the work-piece about the axis of the latter, a hand-operable lever rigidly secured to said shaft for selectively rotating the latter to either said first position or said second position, a pair of fuel conduits each connected to a respective one of said burners for supplying fuel thereto, a pair of coolant supply conduits each connected to a respective one of said spray nozzles, a plurality of valves each connected to a respective one of said conduits for controlling the flow therethrough, each of said valves having a magnetically-controlled actuating mechanism, a plurality of electrical conductors, a first switch for connecting one of said electrical conductors to the magnetically-controlled actuating mechanism of either of the fuel conduit valves alternatively, a second switch for connecting another of said electrical conductors to the magnetically-controlled actuating mechanism of either of the coolant supply conduit valves alternatively, means attached to said switches for operating the latter in unison, a source of electrical energy, a third switch for connecting to said electrical energy source said electrical conductor which is connected to either of the valve actuating mechanisms of said coolant supply conduit valves, a fourth switch for connecting to said electrical energy source said electrical conductor connected to the valve actuating mechanism of either of said fuel conduit valves, an additional pair of switches spaced from each other for connecting said electric motor to said electrical energy source, and means on said hand-operable lever for actuating said fourth switch and one of said additional pair of switches when said shaft is in said first position and for actuating said third switch and the other of said additional pair of switches when said shaft is in said second position.

2. A surface flame hardening apparatus comprising a frame, a shaft rotatably mounted on the frame, a pair of supporting members spaced from each other in a direction along the shaft axis, each of said supporting members having one end non-rotatably secured to said shaft and extending from said one end in a direction away from said shaft axis, a pair of rotatable mounting means each attached to a respective one of the opposite ends of said supporting members for rotatably mounting therebetween the opposite ends of a work-piece to be flame hardened by said apparatus, whereby oscillation of said shaft will cause said mounting means and work-piece mounted therebetween to oscillate in an arc about said shaft axis, a pair of spaced burners each positioned to direct a flame on a local area of said work-piece when said shaft is rotated to a first position, a pair of spray nozzles each positioned to direct a spray of cooling fluid on a respective one of said local areas of the work-piece when said shaft is rotated to a second position, electrical driving means for rotating one of said rotatable mounting means so as to rotate the work-piece about the axis of the latter, and means for rotating said shaft selectively to either of said first or second positions.

References Cited in the file of this patent

UNITED STATES PATENTS

| Number | Name | Date |
|---|---|---|
| Re. 22,064 | Somes | Apr. 7, 1942 |
| 2,102,040 | Slade | Dec. 14, 1937 |
| 2,261,624 | Inskeep | Nov. 4, 1941 |
| 2,282,942 | Crowe | May 12, 1942 |
| 2,290,283 | Jones | July 21, 1942 |
| 2,368,087 | Bishop et al. | Jan. 30, 1945 |
| 2,429,776 | Shorter | Oct. 28, 1947 |
| 2,500,989 | Hartley et al. | Mar. 21, 1950 |
| 2,506,425 | Journeaux | May 2, 1950 |

FOREIGN PATENTS

| Number | Country | Date |
|---|---|---|
| 445,425 | Great Britain | Apr. 8, 1936 |